United States Patent Office 3,415,813
Patented Dec. 10, 1968

3,415,813
PURIFICATION OF MUSK
Paul D. Thomas, Groton, and Charles R. Stephens, Jr.,
East Lyme, Conn., assignors to Chas. Pfizer & Co., Inc.,
New York, N.Y., a corporation of Delaware
No Drawing. Filed Aug. 12, 1966, Ser. No. 573,134
4 Claims. (Cl. 260—236.5)

This invention relates to a new method for purifying musk and more particularly, a new method which comprises deodorizing and decolorizing impure musk by treating such musk at an elevated temperature in an inert solvent with a minor amount of Raney nickel.

Among the objects of this invention is to provide a purified musk fixative for perfumes at a reasonable cost and in a convenient manner. The musks used in perfumery today are derived from several sources. They are obtained from animals, plants and by chemical synthesis. They are usually macrocyclic ketones or lactones. Animal musks are extracted from the glands of the musk ox (*Vibus moschatus*), glands of the civet cat (*Viverra civetta*) and the glands of the muskrat (*Fiber zibethicus*). Only musk obtained from the musk deer and civet cat are commercially important although the musk obtained from the Louisiana muskrat has become increasingly important in recent years. Many other musk-like materials are obtained from animals. For example, concentrates of the urine of the rock-badger (*Hydrax capensis*). Natural musk is also obtained from glands of the musk deer which inhabit the forests of the Himalayas. The musk glands removed from the deer, are allowed to dry either in the sun, or by immersion in hot oil. When the musk is dried and separated from the gland it is known as "musk in grain." Musk in grain will distinctly scent millions of cubic feet of air and is reputed to be more persistent and penetrating than any known substance. A number of plants also contain musk-like materials. The common musk mallow (*Malva moschatus*), musk melon (*Curcumis melo*), the roots of the sumbul plant found in Bokhara (*Ferula sumbul*), ambrette seeds (*Abelmoschus moschatus*) and the roots of angelica (*Angelica archangelica*), all possess musks. Ambrette seeds and angelica root are commercial sources of musk. Synthetic musks were prepared as early as 1933 after the structure of the musk from the ox was determined to be a methyl-substituted-cyclopentadecanone (muskone). In 1926–1927 the musk from the civet cat was determined to be an unsaturated cycloheptadecanone (civetone). In 1928, civetone was synthesized in the laboratory. Other methods of synthesizing musks have been reported. Certain sterols such as androsten-16-ol-3 have been synthesized. The musk lactones, such as cyclopentadecanolactone in angelica root oil and ambrettolide (7-cyclohexadecanolactone) in musk ambrette seed oil, have also been synthesized in the laboratory. Other types of synthetic musks are the macrocyclic anhydrides and macrocyclic ether lactones.

The processes used to purify natural musks, that is those obtained from animals and plants, as well as synthetic musks obtained by chemical synthesis, include fractional distillation and carbon black absorption of the impurities in the crude material. We have surprisingly found that these forms of musk may be purified by refluxing them in the presence of a minor amount of Raney nickel at a substantial savings in cost and without loss of the expensive musk-odor ingredients. Musk obtained from animals contains ammonia, cholesterin, sulfur compounds and other undesirable animal matter which must be removed before the musk is suitable for use in perfumery. The musk obtained from plants and by chemical synthesis usually contains short-chain, unsaturated aldehydes as well as sulfur compounds. The aldehydes are present especially when the synthetic musk is derived from fats or derivatives of fats. These impurities, although present in very small amounts, give undesirable odors to the musk.

While the process of this invention is effective in purifying all forms of natural and synthetic musk, it is particularly useful in treating ambrette seed oil, angelica root oil, the musk from the musk deer, musk ox, civet cat and muskrat as well as the synthetic d,l-muscone, civetone, cyclopentadecanone, cyclopentadecanolide and cyclohexadecanolide.

Broadly, this invention is a process for purifying musk which comprises treating impure musk in liquid form with a minor amount of Raney nickel at an elevated temperature below the boiling point of said musk.

A preferred embodiment of this invention is the process wherein the impure musk is dissolved in a reaction-inert solvent.

Still another preferred embodiment of this invention is the process wherein the minor amount of Raney nickel is from about 5 to about 20 weight percent based on the weight of musk.

Still another preferred embodiment is the process wherein the elevated temperature is from about 50° C. to about 120° C.

A specific embodiment of the process of this invention consists in treating a partially purified musk with Raney nickel. Partial purification of crude musk is accomplished commercially mainly by extraction or distillation both for musk obtained naturally and for synthetic musk. The musk is added to the Raney nickel either as such or dissolved in a reaction inert solvent. Preferred solvents are alkane and aromatic hydrocarbon solvents, having from 6 to 8 carbon atoms, such as hexane, heptane, octane, benzene, and toluene. While pentane may be used effectively, its use increases the fire hazard. Higher alkane hydrocarbons are also effective but are difficult to separate completely from the musk. Alcohols and esters may be used but are not preferred since they tend to esterify and transesterify with the musk lactone. While lower ketones such as acetone, methyl ethyl ketone, methyl isobutyl ketone and diethyl ketone are effective they are not preferred since they possess strong odors themselves and also because they are more expensive than the preferred alkane and aromatic hydrocarbons. The volume ratio of solvent to musk is largely determined by the viscosity of the reaction mixture. Over a 1/1 ratio is found to have a convenient viscosity. Of course, the musk may be treated with the Raney nickel in the absence of solvent in which case the Raney nickel is wet either with water or an organic solvent to prevent its catching fire. The quantity of Raney nickel required, is from about 5 to about 20 weight percent and preferably about 10 weight percent based on the weight of musk, to obtain an economical process. Higher amounts of Raney nickel are also effective but they increase the process costs. The temperature at which the process is conducted will of course depend on the boiling point of the musk. It is preferred to conduct the process at a temperature below the boiling point of the musk to prevent breakdown of the molecule. When a reaction-inert solvent is used in the process, the temperature of the reaction will depend on the boiling point of the solvent. Generally, from about 50° C. to about 120° C. is preferred. While the system need not be brought to reflux and may be heated at a temperature below 50° C. for extended periods of time, it will be obvious to those skilled in the art, that it is much more convenient to bring the system to reflux and allow the system to operate by itself rather than trying to maintain a lower temperature by adjustment of the external heat source. From about 15 minutes to 2 hours has been found to be adequate for 50 gram lots of impure musk. Of course, shorter times are effective and longer periods may be used with an increase in process cost. After the system has cooled to room temperature, the solvent containing the purified musk is decanted from the Raney nickel. The nickel is washed several times with fresh solvent and the solvent portions are combined and evaporated to yield the product. Generally, the solvent is removed by such means as distillation or evaporation. The safest methods for removing flammable solvents are by use of a rotary evaporator under diminished pressure or by distillation under diminished pressure. All traces of the solvent are effectively removed by these processes. Where a reaction inert solvent is not employed, the musk may be separated from the nickel by decantation or by dissolving the musk in one of the aforesaid reaction-inert solvents, decanting the solution from the nickel and evaporating the solvent from the purified musk. Both the solvents and the Raney nickel may be recovered and reused.

EXAMPLE I

In a 1-liter, 3-necked flask fitted with a mechanical stirrer, thermometer, nitorgen inlet tube and reflux condenser with drying tube, was placed 20 g. of Raney nickel that had been previously washed three times with dry ethanol then three times with purified hexane. A gentle flow of nitrogen gas was started before the addition of catalyst to minimize combustion hazards. One hundred grams of freshly-distilled ambrette seed oil, obtained by the distillation of whole, uncrushed seeds, and dissolved in 300 ml. of purified hexane, was added. The resulting mixture was stirred at reflux for 2 hours. The mixture was cooled to room temperature and filtered under a nitrogen atmosphere through a sintered glass funnel. The filtrate was concentrated to dryness on a rotary evaporator and then held at 70° C. (0.5 mm. Hg) for about 1 hour and finally allowed to cool to room temperature. The resulting ambrette seed oil (95 grams) could not be distinguished from commercial ambrette seed oil which had been stored for several months to subdue its initial fatty odor and to develop its distinctive rich, floral-musky odor.

Similar results are obtained when the ambrette seed oil is treated with 5% Raney nickel and with 10% Raney nickel.

EXAMPLE II

One hundred grams of distilled cyclopentadecanolide prepared by the method of Beets and Van Essen, German Patent 1,025,861, was treated by the method of Example I except that 5 grams of Raney nickel were used. The resulting musk had a strong floral-musky bouquet and no longer possessed the sour, sulfur-like odor it had prior to the Raney nickel treatment. Vapor phase chromatography on samples before and after treatment indicated that trace impurities with retention times up to 6 minutes had been almost completely removed. The analyses were conducted on a Wilkens Autoprep Model A-700. Column: Dow Corning Silicone 550, 20% on diatomaceous earth, 9 feet x ¼-inch. Helium: 45 ml./ min. Detector current: 180 milliamps. Temperature: 265° C.

EXAMPLE III

Ten grams of freshly distilled 16-hydroxypalmitic acid lactone (cyclohexadecanolide), prepared by chemical synthesis, and which had a heavy disagreeable odor, was dissolved in 50 ml. of purified hexane in a 150 ml., 3-neck flask. The Raney nickel, 2 grams prepared as in Example I and stored under hexane, was weighed into the flask. The flask was fitted with a nitrogen inlet tube and reflux condenser. Nitrogen was added to the flask as the temperature was raised to reflux in an oil bath on a magnetic hot plate. Stirring during heating was accomplished with a magnet stirrer. The mixture was refluxed for 1 hour and then cooled to room temperature. The hexane was decanted and the flask residue was washed with two, 20 ml. portions of fresh hexane. The combined hexane portions and the hexane from the reaction were diluted to a total volume of 100 ml. and then evaporated on a rotary evaporator. A clear, colorless oil with a light sweet odor and no objectionable side odor was obtained.

EXAMPLE IV

Two hundred grams of freshly distilled 16-hydroxypalmitic acid lactone (cyclohexadecanolid), prepared by thermally-cracking a glycerol ester of 16-hydroxypalmitic acid and co-distilling the lactone and glycerol from the reaction mixture, and 20 grams of water-wet Raney nickel were placed in a 500 ml., 3-neck flask fitted with stirrer, thermometer, nitrogen inlet tube and Claisen head with condenser. The condenser was set for distillation. The resulting mixture was heated with stirring at 120° C. at 20 mmg. Hg pressure to remove the water. The dry mixture was then heated at 100° C. for 30 minutes at atmospheric pressure. While still hot, the musk was filtered through a diatomaceous earth pad in a pressure filter to remove the Raney nickel. The filtered musk, 185 grams, had a definite floral note and lacked the sulfur-like odor and the sharp odor of acrolein that was dominant in the musk prior to the treatment.

EXAMPLE V

When a sample of musk extract obtained by hydrocarbon solvent extraction of musk grains, which in turn are obtained from the pods of the musk sacs of the musk deer, is treated according to the procedure of Example III, there is obtained a musk having a sweeter odor and a lighter color than the musk prior to treatment.

Similar results are obtained when the musk resinoid, which is obtained by evaporating off the hydrocarbon solvent of the musk extract, is treated according to the procedure of Example IV. The product has a sweeter odor and lighter color than the musk resinoid.

EXAMPLE VI

When a sample of musk extract obtained by hydrocarbon solvent extraction of musk grains is dissolved in n-octane, 50 grams of musk in 250 ml. of n-octane, and heated at 50° C. for 15 minutes in the presence of 5 grams of octane-wet Raney nickel, the musk obtained after filtering and drying, has a mild floral odor and smells much sweeter than the crude musk prior to the treatment.

Equivalent results are obtained when n-octane is replaced with benzene and with toluene.

What is claimed is:

1. A process for purifying musk which comprises treating impure musk in liquid form with a minor amount of Raney nickel at an elevated temperature below the boiling point of said musk.

2. A process according to claim 1 wherein said impure musk is dissolved in a reaction-inert solvent.

3. A process according to claim 1 wherein from about 5 to about 20 weight percent of Raney nickel based on the weight of musk is used and said elevated temperature is from about 50° C. to about 120° C.

4. A process for purifying musk which comprises treating impure musk dissolved in an alkane having from 6 to 8 carbon atoms with about 10 weight percent Raney nickel based on the weight of musk at reflux temperature for from 1 to 2 hours and recovering the musk thereby purified.

References Cited

UNITED STATES PATENTS 3,235,601  2/1966  Parsons et al. _____ 260—586

JAMES A. PATTEN, *Primary Examiner.*

U.S. Cl. X.R.

260—343, 586; 167—94